United States Patent
Strizhevskiy

(10) Patent No.: US 6,381,284 B1
(45) Date of Patent: Apr. 30, 2002

(54) METHOD OF AND DEVICES FOR TELECOMMUNICATIONS

(75) Inventor: Naum Z. Strizhevskiy, Verona, NJ (US)

(73) Assignee: T. Bogomolny, Morris Plains, NJ (US)

( * ) Notice: Subject to any disclaimer, the term of this patent is extended or adjusted under 35 U.S.C. 154(b) by 0 days.

(21) Appl. No.: 09/332,403

(22) Filed: Jun. 14, 1999

(51) Int. Cl.[7] .................................................. H04B 3/00
(52) U.S. Cl. ...................................................... 375/257
(58) Field of Search ................................ 375/257, 258, 375/285, 222, 346; 370/282, 286, 287, 288, 276, 289, 296; 379/3, 406, 409, 410, 416; 455/570; 359/109, 113, 152, 154, 153, 173, 145, 179, 181, 189, 194, 341, 163; 385/100, 86, 76, 115, 123, 101, 174, 125

(56) References Cited

U.S. PATENT DOCUMENTS

| | | | | |
|---|---|---|---|---|
| 5,668,794 A | * | 9/1997 | McCaslin et al. | 370/288 |
| 5,812,537 A | * | 9/1998 | Betts et al. | 370/286 |
| 5,875,246 A | * | 2/1999 | Houghton | 379/406 |
| 5,929,896 A | * | 7/1999 | Goodman et al. | 348/14 |
| 5,987,098 A | * | 11/1999 | Wintour | 379/3 |
| 6,028,684 A | * | 2/2000 | Kidorf | 359/110 |
| 6,097,533 A | * | 8/2000 | Atlas | 359/337 |
| 6,111,679 A | * | 8/2000 | Fishman | 359/173 |
| 6,144,784 A | * | 11/2000 | Shigehara et al. | 385/24 |
| 6,160,659 A | * | 12/2000 | Kinoshita | 359/337 |

* cited by examiner

*Primary Examiner*—Chi Pham
*Assistant Examiner*—Emmanuel Bayard
(74) *Attorney, Agent, or Firm*—I. Zborovsky

(57) ABSTRACT

A method of telecommunications as simplex and/or (half-) duplex signal transmission through coaxial and symmetrical pairs of metallic wires, fiber optics and metallic waveguides and other cables by means of engage of full/part an echo reflections of a signal in spans of a system of telecommunication at end/s of a pair/waveguide/cable neither more nor less than it is necessary/enough to signal transmission with given/rated accuracy/error ratio and release in this way, and bring into use the latend today uselessly losing now signal energy by means of switch on at end/s of the pair/waveguide/cable the end connector-equalizer.

17 Claims, 2 Drawing Sheets

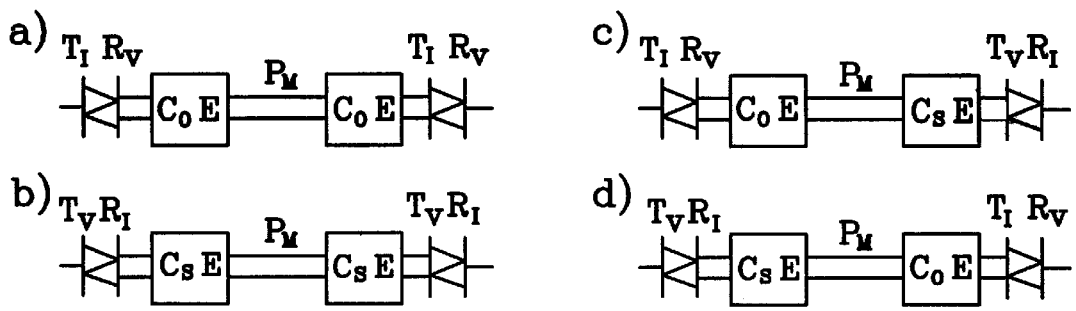
FIG. 1
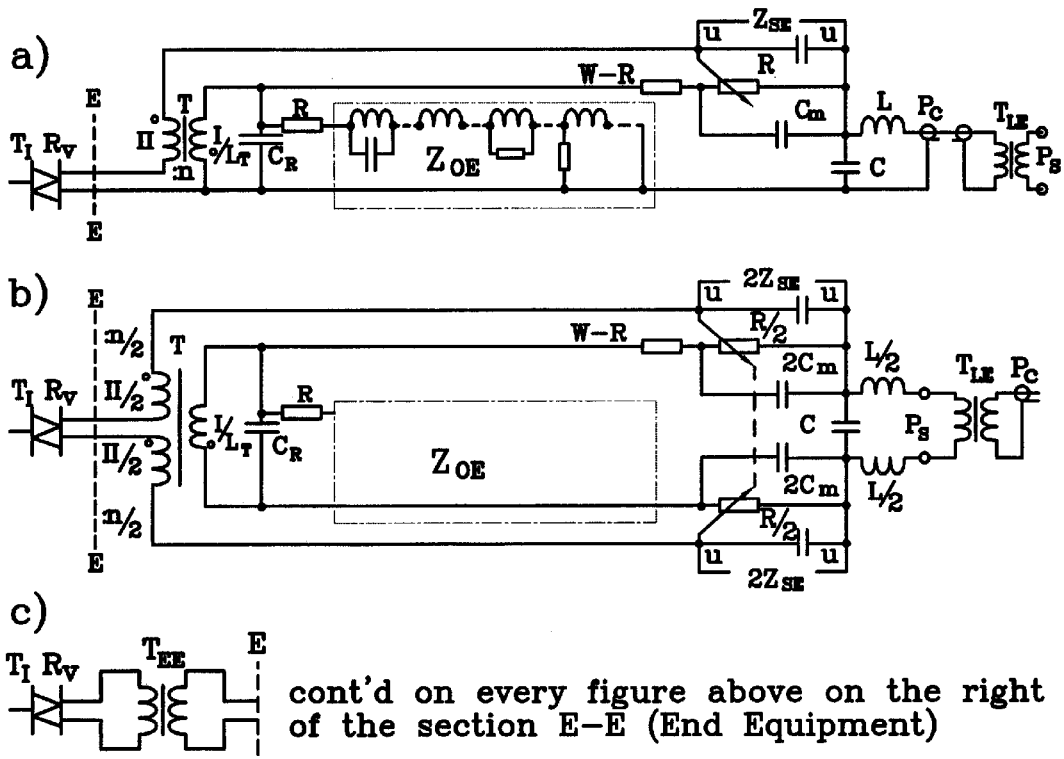
cont'd on every figure above on the right of the section E-E (End Equipment)
FIG. 2 ($C_m = L_T/R^2$)
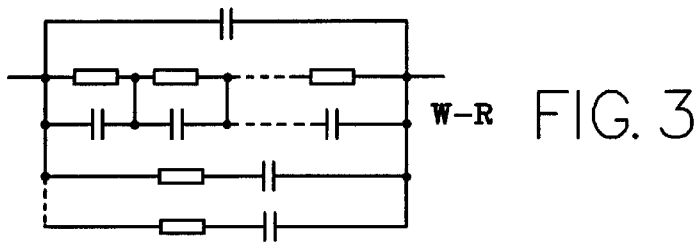
FIG. 3

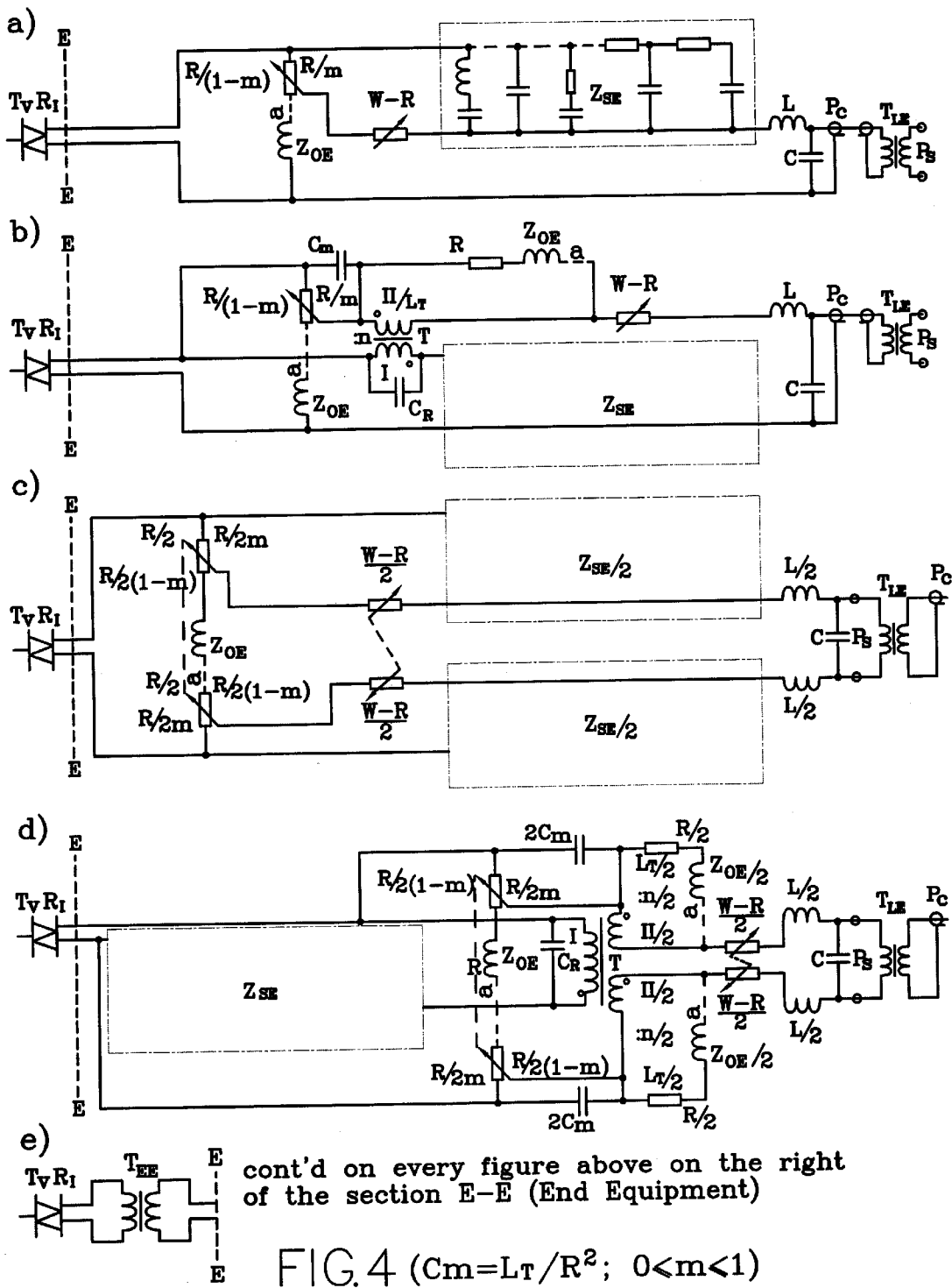
FIG. 4 ($C_m = L_T/R^2$; $0 < m < 1$)

METHOD OF AND DEVICES FOR TELECOMMUNICATIONS

BACKGROUND OF THE INVENTION

The present invention relates to telecommunications and can be used in single and multi-span simplex and (half-) duplex analog and digital systems of local and long distance communication through coaxial and symmetrical physical pairs of metallic wires, fiber optics and metallic waveguides and other cables for transmission of data, telephone. television, internet, and other coded/modulated/any signals.

A method of simplex and/or (half-) duplex electrical communication through coaxial and symmetrical pairs of metallic wires, fiber optics and metallic waveguides and other cables, in the spans of which the echo-reflections of signals is suppressed at the ends of the pair/waveguide/cable is universally known and world-wide accepted (CCITT recommendations G332, e), and G333, e); and also CCIM recommendation 567-2, XVI Plenary Assembly, V12, Jeneve, 1986). For this purpose the output/input resistance of the connected with them equipment is formed equal to their rated wave resistance.

There are known devices for telecommunication realizing a well known method, which during the transmission the signal is compressed in frequency spectra, converted/(re-) coded in time and/or level/amplitude, frequency, phase and/or various types of modulation/manipulation, (pre-) equalization, etc., are introduced, for example in Digital Subscriber Loop Technologies A, H, S, V, or XDSL, etc. (ATG'ss Communications and Networking Technology Guide series copyright 1997 by the applied technology group, and the DSL Source Book, Plane Answers About Digital Subscriber Line Opportunities, winner of 1997 Excellence Award, Society of Technical Communication (STC). Second Edition, copyright 1998, Paradyne Corporation). This method performs more efficiently or more complete a range of amplitude characteristic, protection from interferences/noises bandwidth, energy and other possibilities of existing devices for telecommunication, and as a result their carrying capacity, transmission distance/ span length, volume of services, profitability, etc., are increased.

However, in the devices of all known systems of telecommunication, during suppression of signal reflections at the end of the pair/waveguide/cable, energy and protection from interferences/noises of signal are uselessly wasted at each span, and additional system distortions are introduced. Losses are so great that when they are bringing into use, either the above listed processing of the signal is not needed, or it will be several times more efficient.

Devices for telecommunication through coaxial and symmetrical pairs of metallic wires are generally known, in which, the spans at the end of the pair connected to the output of the transmitter and/or input of the receiver signal formed as a current generator and/or a voltage amplifier, a matching resistor which is equal to a rated wave resistance of the pair is connected parallel to the pair, and at the output of the transmitter and/or input of the receiver formed as a voltage generator and/or a current amplifier, a matching resistor is connected in series to the pair, (CHU-SUN YEN, CRAWFORT R. D. Distribution and Equalization of signal on coaxial cables used in 10 Mbit/s baseband local area networks./IEE Trans.-1983.-V.com-31, N 10,-P.1181–1186).

In the devices of existing well-known systems of telecommunication through coaxial and symmetrical pairs of metallic wires, at the each end of each physical pair on matching resistors signal energy is uselessly wasted for suppression of echo of signals from the ends of the pair at the end of the pair in over necessary and sufficient for transmission with practically ideal accuracy (0.01–0.001). At the resistor which matches the heat of the pair, in spans of existing and generally known devices of systems telecommunication, half signal energy is uselessly wasted during transmitting. Only in a particular case by attenuation of the pair up to 10–15 dB at an average during the transmitting ⅒th part of energy is uselessly lost. At the resistor which matches the pair end, by pair attenuation over 20–30 dB during the receiving, all signal energy is uselessly lost and only in a particular case during attenuation 10–30 dB a part of energy is lost. As a result, at the end of each physical pair of each span, the received signal is uselessly weakened 1–2 times by attenuation pair up to 10–15 dB, 2–4 times by attenuation 10–30 dB and 4 times by attenuation 20–30 dB, and how much greater. Accordingly, the efficiency of signal energy is reduced at each span 1–4 times, 4–16 times, and 16 times, the received signal is additionally distorted and reduced and the protection of signal from noises/interferences/influences is lowered, while the pair itself has attenuation which is not of less but only a known attenuation. Even greater energy is lost at each span in a transmitting equipment for realization of its practical zero or infinite output resistance formed as voltage/current generator of signal for uselessly stable suppression of echo from the ends of pair in a transmitting equipment by its matching resistor, above a practically necessary and sufficient one.

The known devices for telecommunication through fiber optics and metallic waveguides and other cables possess the same disadvantages. As a result, by any given frequency band and transmission distance the universally known existing world-wide accepted systems of telecommunication are excessively expensive and complicated. They need a great quantity of equipment, number of spans and repeater/ regenerative stations. For increase of frequency band, transmission speed, carrying capacity and/or transmission distance/span length, it is necessary to provide very expensive and/or lengthy laying of new lines and/or replacement of existing wires/waveguides/cables, equipment and places of its mounting. This makes the systems and networks of transmission more complicated, prevents its development and requires a lot of time.

SUMMARY OF THE INVENTION

Accordingly, it is an object of the present invention to increase a frequency band, transmission speed, carrying capacity and/or span length, and/or reduction of cable section, a quantity of equipment and a number of spans and/or simplification and cost reduction of them and the telecommunication by release/bring into use of a hidden signal energy which is useless lost now, by weakening of it inside the spans of attenuation and distortion of connected existing pair/waveguide/cable and/or conversion of it into additional amplification, equalization and interference/noise immunity/protection of the signal.

In keeping with these objects and with others which will become apparent hereinafter, separately in each span at any or at both end/s of the pair/waveguide/cable, the signal is full reflected, and for this purpose in the spans with coaxial or symmetrical pair of metallic wires at any given or in any combination at both end/s of the pair a mode of idle running is introduced, and the equipment connected to the pair is formed as a current generator and/or voltage amplifier. Or a mode of short-circuit is introduced, and the equipment connected to the pair is formed as a voltage generator and/or current amplifier. Analogously, in the span/s with fiber optics or metallic waveguides, or other cables, the signal is full reflected at any or both ends, and with reduction of frequency during suppression of introduced echo from the ends of the pair/waveguides/cable along them between their ends, with its attenuation insufficient for transmission of the required/rated accuracy/error ratio, at these frequencies at the same ends by the pair/waveguide/cable of the same spans the introduced full reflection is replaced by a partial reflection. In each span separately the output/input resistance of the equipment connected with them is changed in direction of its wave resistance so as to weaken the echo introduced at any/both ends of the pair/waveguide/cable in over to weakening of the introduced echo along them between their ends of their attenuation, so as to provide as a sum a minimal required as sufficient for the given/rated accuracy/error ratio of transmission. However, moreover at the same single or separately in any combination, at both ends of the pair/waveguide/cable of span, the signal is amplified, equalized and protected from interferences/noises by (auto-) transformer and/or resonant circuit, which is controlled by the signal reflection introduced at the given end, and acts proportionally to it. Or the above listed operations in above listed way are performed by the pair/waveguide/cable length of short than quarter wavelength of the upper-frequency limit of the transmitted signal.

In order to achieve the same objective, separately in each span between coaxial or symmetrical pair and the equipment-transmitter-receiver connected to it, cable end connectors-equalizers are introduced. At this end of the pair during the duplex connection the transmitter-receiver of the signal are formed as a current generator and a voltage amplifier or a voltage generator and a current amplifier.

And at the end of the pair connected to the equipment formed as a current generator and/or voltage amplifier, in the cable end connector-equalizer an opening equalizing circuit is introduced in series with the matching resistor. It is formed as a series inductors, a part of which is shunted by resistors and/or capacitors. In addition, a low frequency matching circuit is introduced and connected in series to them, which is formed as a series of resistors shunted by capacitors and/or R-C circuits, which is equal to an increment of a wave impedance of the pair at low frequencies. And/or a resonant circuit is introduced and a inductor/s of the circuit are connected in series to the wires of the pair end, and a capacitor of the circuit is connected parallel to the connected in series matching resistor and the introduced opening equalizing circuit and the low frequency matching circuit. Or a equalizing (auto-) transformer is introduced, whose primary winding is connected parallel to the introduced opening equalizing circuit, and whose secondary winding is connected in accordance with the primary winding in series to the connected equipment. Or the matching resistor is formed as a potentiometer, whose one leg connected in series between the interconnected pair and equipment. Or a capacitor is introduced and connected parallel to the matching resistor/potentiometer or parallel to it and the introduced series to it low-frequency matching circuit, and in addition, either in the opening equalizing circuit a resistor shunted by the inductor with inductivity $L_2$, formed equal to a rated wave resistance R of the pair and capacity of the introduced capacitor is equal to $L_4/R^2$. Or together with the (auto-) transformer a resistor with equal to rated wave resistance R is introduced and connected in senes to the opening equalizing circuit, and they shunts the primary winding of the (auto-) transformer with inductivity $L_T$ and the capacity of introduced capacitor=$L_T/R^2$.

While at the end of the pair connected to the equipment such as a voltage generator and/or current amplifier, into the cable end connector-equalizer a shorting equalizing circuit is introduced and connected parallel to the matching resistor, in which in parallel connected and/or series resonant circuits, capacitors, series and/or integrated stairs R-C circuits. Or a low frequency matching circuit is introduced and connected in series to them, or it is connected in series with the matching resistor, and together they are shunted by the introduced shorting equalizing circuit. Or a resonant circuit is introduced and the inductor/s of the circuit are connected in series to the wires of the pair end, while a capacitor of the circuit is connected between the end of the pair. Or a equalizing (auto-) transformer and resistor with equal to rated wave resistance R is introduced, while the secondary winding of the (auto-) transformer with inductivity $L^T$ is shunted by introduced resistor and connected in series to the matching resistor, while the primary winding in accordance to secondary winding is connected through a shorting equalizing circuit parallel to the connected equipment, and also a capacitor with a capacity $C=L_T/R^2$ is introduced and connected parallel to the matching resistor. Or the matching resistor with equal to rated wave resistance R is formed as a matching resistive divider which is introduced parallel to the connected equipment, with the resistance of the parallel legs of divider=R and the wires of the pair connected directly or through introduces elements to cross-leg of the divider while the length-leg is shunted by the shorting equalizing circuit or directly by a capacitor C when the (auto-) transformer is introduced. Or for controlling the equalization, the introduced matching resistive divider is formed as a row of weight resistors whose resistance of parallel connection is equal R and the resistance of each is more than R and inversely proportional to the relative step of change it division, and a switch is provided from one leg to the other. Or in the cable end connector-equalizer is introduced and on any or both end/s, and/or between branches a (auto-) transformer switched on. Or in the cable end connector-equalizer is introduced and to a winding/s of the introduced (auto-) transformer/s and/or to a transmitter-receiver is connected resonating capacitor/s.

In the end cable connector-equalizing a of coaxial design the matching resistor/potentiometer/divider and other elements are connected in the circuit of the inner wire, while by a symmetrical design, they are connected symmetrical into the circuit of each wire and their identical cross branches are connected in series. Or in addition the formed pairs of identical elements are replaced with one equivalent element.

For the purpose of immediate improvement of the telecommunication systems and their equipment, the introduced cable end connector-equalizer is connected to the improved equipment through one/both way repeater/equalizer/regenerator/converter, with one output/input connected to the cable end connector-equalizers which corresponds to the type of the connected cable end connector-equalizer, while the other input/output is corresponds to a resistance of the improved equipment or two cable end connectors-equalizers are connected by one/both way repeater/equalizer/regenerator/converter and its output/input to each of two connected cable end connectors-equalizers in correspondence to the type of the connected cable end connectors-equalizers, while one of the cable end connectors-equalizers is connected to the improved equipment.

In order to improve the efficiency of the equipment formed as current generator/voltage amplifier, the length-leg of the potentiometer connected between the equipment and the pair end is shunted by the shorting equalizing circuit, and by the equipment formed as voltage generator/current amplifier the opening equalizing circuit is connected one in series to the resistor which shunts the secondary winding of the (auto-) transformer, and/or the other circuit is connected in series to the cross-leg of the matching resistive divider.

The (auto-) transformer and/or introductor/s of the cable end connector-equalizer are implement with taps.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 shows a block diagrams of wire spans of systems of telecommunication with an equipment-transmitter-receiver as:

a) a current generator and/or a voltage amplifier at both ends of the pair;

b) a voltage generator and/or a current amplifier at both ends of the pair;

c), d) a voltage generator and/or a current amplifier at one end and a current generator and/or a voltage amplifier at the other end of the pair;

FIG. 2 shows a versions of schematic diagrams of cable end connector-equalizer for equipment-transmitter-receiver as a current generator and/or a voltage amplifier by:

a) a coaxial design;

b) a symmetrical design;

c) engage the equipment end transformer.

FIG. 3 shows schematic diagram of a low frequency matching circuit;

FIG. 4 shows a versions of schematic diagrams of a cable end connector-equalizer for equipment-transmitter-receiver as a voltage generator and/or a current amplifier by:

a), b) coaxial design;

c), d) a symmetrical design;

e) engage the equipment end transformer.

The symbols which are used in the drawings are as follows:

$P_M$=is a physical pair of metallic wire;

$P_C$=is a coaxial physical pair;

$P_S$=is a symmetrical physical pair;

$T_V R_I$=is a transmitter and/or receiver as a voltage generator and/or a current amplifier;

$T_I R_V$=is a transmitter and/or a receiver as a current generator and/or voltage amplifier;

$C_S E$=is a shorting cable end connector-equalizer;

$C_O E$=is an opening cable end connector-equalizer;

R=is a matching resistor/potentiometer/divider which equal to the rated wave resistance R of the pair of metallic wire;

R/m, R/(1−m)=is legs of matching resistive divider and their resistance;

W-R=is a low frequency matching circuit and its impedance;

$C_M$=is a capacitor of matching resistor and its capacity;

$Z_{SE}$=is a shorting equalizing circuit;

$Z_{OE}$=is an opening equalizing circuit;

$L_Z$=is an inductor of an opening equalizing circuit and its inductivity;

LC=is a resonant circuit;

$C_R$=is a resonanting capacitor and its capacity;

T=is a equalizing (auto-) transformer;

$T_{EE}$=is an equipment end transformer;

$T_{LE}$=is a line end transformer;

$L_T$=is the inductivity of a winding of an (auto-) transformer;

n=is a turns ratio;

a=is a number of series branches of circuit $Z_{OE}$;

u=is a number of parallel branches of circuit $Z_{SE}$;

m=is a division ratio (o$\leqq$m$\leqq$1).

DESCRIPTION OF PREFERRED EMBODIMENTS

The method in accordance with the present invention and the devices in accordance with the present invention is performed and runed in the following manner.

In order to release and brings into use a signal energy which was hidden now and uselessly lost in known devices of known systems of telecommunication by known method, in the spans of the proposed system of telecommunication proposed devices by proposed method a full or maximum permissible partial reflections of signal/s from the end/s of the pair/waveguide/cable is introduced, depending on its attenuation level and given/rated accuracy/error ratio of transmission.

The introduced echos pass along the spans in turn, by turns in directions and opposite to and concomitant to a direction of the signal, and after each passage of the span along the pair/waveguide/cable, between their ends they are suppressed by a value of its attenuation. The echos which concomitant to the signal reach the end of the span together with the received signal, distort the signal and their relative value determines the quality and accuracy/error ratio of the transmission. Relatively to the receiving signal, in each span the first echo which is concomitant to the signal is suppressed by the double attenuation level of the pair/waveguide/cable, so far as it passes the span two times: in a opposite and concomitant to the signal directions and each subsequent echo which is concomitant to the signal is suppressed more than the preceding echo by the double attenuation of the pair/waveguide/cable of the span.

The introduced echos which are concomitant to the signal and suppressed 100 times/by 40 dB practically do not influence the accuracy/error ratio of the transmission: they are lower than a threshold of noticeability, and by the suppression 1000 times/by 60 dB practically ideal accuracy/error ratio of the transmission is guaranteed. In each span by the attenuation of the pair/waveguide/cable 20–30 dB and more, the introduced echos are suppressed along them between their ends with its attenuation by the double its attenuation level, and by the introduced full reflections of the signal from their ends are suppressed more than 100–1000 times/by 40–60 dB, which is more than sufficient for transmission with a practically sufficient/ideal/rated accuracy/error ratio. When the attenuation of the pair/waveguide/cable is lower 20–30 dB, in addition to the remaining suppression of the concomitant echo introduced by them by double value of their attenuation, a full reflection of the signal from their ends is replaced by a lower, partial reflections, so that the remaining lower weakening of the introduced concomitant echo by the pair/waveguide/cable of the span the double value of their attenuation together with the introduced sum partial weakening of the concomitant echo at both ends of the pair/waveguide/cable of the span will suppressed the introduced echos by 40–60 dB, and not less and not more, but sufficient only for the practically sufficient/ideal accuracy/error ratio of transmission by attenuation of the pair/waveguide/cable from the least at DC-zero frequency to 20–30 dB.

Therefore, for transmitting with practically sufficient/ideal accuracy/error ratio, instead of the generally accepted full suppressions of the reflections of signal at ends of the pair/waveguide/cable of the spans of the well known telecommunication systems (at each end no less than 16–32 times/by 24–30 dB, as required/recommended by existing standards of all countries and international recommendations CCITT, G332e) and G333e) and also CCIM 567-2, XVI Plenary Assembly, V12, Jeneva, 1986), and contrary to them, in accordance with the inventive method, the proposed devices of telecommunication introduce a completely opposite approach, full reflections of a signal at the ends of the pair/waveguide/cable of the spans (somewhat less than the full reflections only in a particular case of there attenuation up to 0–20–30 dB), and in each span separately in the following way, release and bring into use the whole potentially possible to this day hidden, unbelievably great energy of signal which is uselessly lost now.

In spans with coaxial or symmetrical pair of metallic wires $P_M$ (FIG. 1) with the introduced opening cable end connector-equalizer $C_OE$ (FIG. 2) connected the wires of the pair PM with the equipment-transmitter/receiver of the signal formed a current generator and/or a voltage amplifier $T_I R_V$ (FIG. 1, a, c, d), where the end of the pair $P_M$ is shunted by connected in series matching resistor/potentiometer and introduced opening equalizing circuit $Z_{OE}$ and a low frequency matching circuit W-R.

At the frequency of alternating current net and adjoining low frequencies, the impedance of the opening equalizing circuit $Z_{OE}$ is equal to a zero reactance of a series inductors of the circuit $Z_{OE}$ at this frequencies. The resistance of the matching resistor/potentiometer R is equal to a rated wave resistance of the pair-constant resistive component R of the wave impedance W of the pair. The impedance of the introduced low frequency matching circuit W-R is equal to a resistive-capacitive increment of the wave impedance of the pair with a reduced frequency. In sum they are equal wave impedance W of the pair, and together by the zero impedance of the introduced opening equalizing circuit $Z_{OE}$, the suppress the reflections of signal at the connected end of the pair. Moreover, the impedance of the introduced the low-frequency matching circuit W-R weakens the shunting of the connected end of the pair by matching resistors/potentiometer R, and in this way with reduction of frequency increased and equalized the signal at the given pair end and protect the signal from external low-frequency influences/interferences of the alternating current net along the pair, and also increased the impedance of circuit of wires of the pair, so as to weak them again and to protect the signal further.

With the increase of frequency and attenuation of the pair, the reactance of the series inductors of the introduced opening equalizing circuit $Z_{OE}$ (FIG. 2) increases, and in the beginning partial and then full turn off of the matching resistor/potentiometer R and the introduced low-frequency matching circuit W-R. This eliminates the existing now useless energy losses at the matching resistor and prevent their appearance at the introduced low-frequency matching circuit W-R. Correspondingly, at the connected end of the pair $P_C/P_S$ a mode of idle running is introduced, and together with it partial or full signal reflections is introduced. The partial signal reflections is introduced and mould inductors of the circuit $Z_{OE}$ of a maximum inductivity, shunted by the resistors. The remaining inductors of the lower inductivity and/or shunted capacitors and forming parallel resonant circuits, are introduced, and mould a transition to a full and a full reflections of the signal. There selection is used for moulding an increase of impedance of the introduced opening equalizing circuit $Z_{OE}$ relative to the wave impedance W of the pair, and for introduction of maximum partial and full reflections of signal not more and not less but just sufficient for transmission with the given/rated accuracy/error ratio by the given weakening of the introduced echo by attenuation of connected given pair in sum with the introduced/given attenuation of echo at the opposite end of the given pair. Correspondingly at the connected end of the pair together with the introduced mode of idle running increase and in finally the signal voltage is doubled and energy is quadrupled, supplied to the pair during the transmitting and from the pair during receiving.

As a result, during the transmitting a half current of the transmitter-current generator $T_I$ of signal is no more branched and not lost uselessly in the circuits of matching, and the total current of the generator and not only half current as now, is supplied to the pair $P_C/P_S$, doubles the voltage of signal at it, quadruples the transmitted energy of signal, doubles the pre-protection of signal from external interferences along the whole pair way and at the opposite end from the noise of the equipment which receives the signal, and so, thus much pre-equalize the system distortions of the pair and transmitted signal.

Independently from this, during the receiving, according to the approach of signal to the end of the span, due to the introduced mode of idle running, the signal voltage is weakened less than now along the pair and is two times lower weakened at the very end of the pair. Instead of useless losses now of the whole energy of the received signal at the pair end at the matching resistor R, in the spans of the proposed system of telecommunication within the frequency band, equalized by the introduced cable end connector-equalizer COE, the attenuation of the connected existing coaxial $P_C$ (FIG. 2a) or symmetrical $P_S$ (FIG. 2b) pair becomes lower by 6 dB than the known by registration certificate and the distortions/increase of attenuation and group delay time becomes lower than by certificate. The protection of signal from influences/interferences of the pair near the end and from noises of the equipment received the signal is increased twice, and a system distortions of the pair and signal so, thus much is equalized. In correspondence to the two times lower weakening of the signal, the "zero" signal energy which is four times greater is supplied from the pair into the voltage amplifier at the input of the signal receiver $R_V$, whose real "infinite" input resistance hundreds and thousand times greater than the wave resistance of the pair and practically does not influence the introduced mode of idle running and the above mentioned results.

The introduced resonant circuit LC (FIG. 2) is controlled by the introduced opening equalizing circuit $Z_{OE}$ and increases more the efficiency of signal energy. The end of the connected pair $P_C/P_S$ is connected in series with the inductive L-branch of the circuit and the capacitive C-branch and the circuit LC are shunted by the matching resistor R and introduced low-frequency matching circuit W-R through the introduced opening equalizing circuit $Z_{OE}$. The increase of its impedance $Z_{OE}$ controls the resonant circuit LC, and at the value which is substantially greater when the wave impedance W of the pair, at the connected end of the pair the mode of idle running is introduced and together with it the resonance increase of the signal and its power is provided.

During the transmitting in the mode of idle running introduced by the equalizing correction circuit $Z_{OE}$, not a half as now but instead the increased twice whole current of the current generator of the high omid signal transmitter $T_I$ is supplied in the introduced resonant circuit LC and through inductor L of the circuit LC into the connected pair $P_C/P_S$. For the current generator $T_I$, the introduced resonant circuit LC is a parallel circuit. With approach to the resonant frequency and at the resonant frequency, the resistance of the parallel circuit LC is resonantly increased, and with the same current generator $T_I$ the voltage at the circuit and the current in the circuit threw the connected pair is resonantly increased twice due to the introduced mode of idle running, and moreover by the value of the Q-quality of the introduced resonant circuit. The pre-protection of the transmitted signal from influence/interference along the whole way of connected pair and from noises of equipment which received signal at the other end of the pair is increased to the same degree, and the system distortions of the pair and transmitted signal is pre-equalized to the same degree. During this process the energy of the signal is greater as a square of the value is taken from the current generator $T_I$, and supplied into the introduced resonant circuit LC, and from it is transmitted in the connected pair $P_C/P_S$. In addition with the resonant take off of the power, the generator-transmitter of signal is simpler and its efficiency is higher so far as the products of nonlinear distortions of the signal transmitter is beyond the resonant band and beyond the transmitted frequency band and therefore do not distort the signal.

During the receiving, the opening equalizing circuit $Z_{OE}$, with the increase of frequency and attenuation of the pair unloads the introduced resonant circuit LC and through it introduces the mode of idle running at the connected end of the $P_C/P_S$. The voltage at the end of the pair is doubled, and the doubled, amplified by the introduced resonant circuit LC is supplied from the capacitor C of circuit to the voltage amplifier which is a high omig input of the receiver $E_V$. The pre-protection to the noises of the amplifier of the receiver $E_V$ is increased to the same degree, and the system distortions of the pair and the received signal is equalized to the same degree. The power of the signal increased to a square is supplied to the high omig input of the voltage amplifier $E_V$. Its real input resistance several orders higher than the wave resistance of the pair, and the taken over "zero" power practically does not influence the introduced mode of idle running, resonant amplification and achieved results.

The resonant circuit is introduced preferably for equalizing of the greatest attenuation of the pair at the upper limit of the transmitted/equalized frequency band. Therefore the elements of the introduced circuit practically do not influence the introduced mode of idle running at the connected end of the pair, and the results obtained by the introduction of the resonance are added to the already achieved results due to the introduced mode of idle running.

The resistance of the pair connected in the inductive L-branch as the resonant circuit makes the resonance of a low Q-quality and the resonant amplifying of the signal is introduced into the sufficiently wide frequency band, as needed. Several resonant circuits which are connected analogously, expand the frequency band which is equalized by them.

The action of the introduced resonant circuit on the reflections of the signal at the connected end of the pair does not reduce the given/rated accuracy/error ratio of the transmission, which has been achieved already by the introduction of the idle running so far as the resonance is introduced at the frequencies of full reflections of the signal at the given end of the pair during attenuation of the introduced echo along the pair between its end by its attenuation and at the opposite end of the pair which in sum is sufficient for transmission of the given accuracy/error ratio.

The introduced equalizing (auto-) transformer T (FIG. 2) does not act at low frequencies. The low frequency signal is transmitted bypassing it. The primary winding I of the equalizing (auto-) transformer T with inductivity $L_T$, shunted by the introduced resistor with resistance R, and the matching resistor with resistance R shunted by the introduced capacitors CM with capacity=$L_T/R^2$ have a constant resistance R equal to a rated wave resistance of the pair $P_C/P_S$ of the span. They shunt the current generator voltage amplifier of the transmitter-receiver $T_I R_V$ of the signal and the connected end of the pair $P_C/P_S$ directly or through the introduced low-frequency matching circuit W-R. At low frequencies by "zero" impedance of introduced opening equalizing circuit $Z_O$ their impedance is equal to wave impedance W of the connected pair $P_C/P_S$ and at the given end of the pair there are no reflections of the signal. During the transmitting the half of current of current generator of the transmitter $T_I$ of the signal is supplied into the pair and transmitted, while the other half, as nowadays, is branched into the matching circuit. During the receiving the whole signal is supplied from the pair directly to voltage amplifier $E_V$ and received.

With the increase of the frequency the introduced capacitor CM shunts more and more the matching resistor R, and the impedance of the introduced opening equalizing circuit $Z_{OE}$ in series to resistor R and the less shunted of it primary winding I of the introduced equalizing (auto-) transformer T increase even more, and at the connected end of the pair $P_C/P_S$ by the short-circuited matching resistor R the idle running mode is introduced.

During the transmitting in the introduced mode of idle running, not a half as now but the increased twice whole current of the current generator of high omig signal transmitter $T_I$ is supplied directly through the secondary winding II of the introduced equalizing (auto-) transformer T into the connected pair $P_C/P_S$ and moreover from the secondary winding II into the primary winding I, the current is transformed and a greater current of signal is supplied from it by the turns ratio n into the pair with n-time greater value. In sum 2(n+1) times greater by at now current and voltage of signal with square value greater energy are supplied directly and through the (auto-) transformer into the connected pair and transmitted. In correspondence to the increase of voltage, the pre-protection of the signal from influences/interferences is introduced along the whole pair way, and from the noise of the receiving equipment at the other end of the pair, and also pre-equalized system distortions of the pairs and the transmitted signal.

During the receiving in the introduced mode of idle running, the attenuation of the connected pair is reduced, and the double signal voltage from the end of the pair $P_C/P_S$ which is twice less as now weakened owing to lessening of the attenuation of the pair, appears through the introduced capacitor CM bypassing the matching resistor R at the primary winding I of the introduced equalizing (auto-) transformer T opened of the introduced opening equalizing circuit $Z_{OE}$. The double signal voltage from the primary winding I with the turns ratio n is transformed into the secondary winding II, and supplied in sum with the double signal voltage at the end of the pair $P_C/P_S$ by 2 (1+n) times greater by at now, to the voltage amplifier at the input of the signal receiver $E_V$. In correspondence with the increase of the signal by 2 (1+n) times, the pre-protection of this signal from noise of receiving equipment is introduced, the system distortions of the pair and the receiving signal are equalized to a same degree, and square times greater "zero" energy of signal is supplied to the input of the voltage amplifier of the signal receiver $E_V$ with a real "infinite" input resistance. Since during the transition in the mode of idle running there is "no" current at the end of the pair through the matching resistor R and there is "no" voltage drop of the receiving signal at it, all the above mentioned results are provided even without the capacitor $C_M$, and without the resistor R which shunts the primary winding I of the (auto-) transformer T for better suppression of the low frequency reflections of the signal during the receiving, introduced by the capacitor $C_M$.

In contrast to the known connection, the introduced (auto-) transformer T which is controlled by the introduced opening equalizing circuit $Z_{OE}$ maintains the rated input/output resistances of the connected equipment to direct current, equal to resistance R of their matching resistor, and therefore maintains their mode of direct current, and in the presence of the introduced (auto-) transformer T the signal is transmitted and equalized from 0 Hz. At the output of the amplifier of direct current, the introduced resonant circuit LC and/or the (auto-) transformer T makes possible the obtaining of the signal with a voltage which exceeds the direct supply voltage. Since the signals of low frequencies are transmitted bypassing the (auto-) transformer it is simple and miniature.

The matching resistor R formed as potentiometer-controller of equalizing level of the signal (FIG. 2) bring in and controls the weakening of low frequencies of the signal. In series with one leg of the potentiometer R, the opening equalizing circuit $Z_{OE}$ is connected, and the other leg is shunted by the introduced shorting equalizing circuit $Z_{SE}$. Besides that, the matching resistor/potentiometer R is shunted by the introduced capacitor $C_M$. At the low frequencies the impedance of the circuit $Z_{OE}$ is equal zero, and of the circuit $Z_{SE}$ and the capacitor $C_M$ is infinite, and the potentiometer R respectively to position during the transmitting weakens/divides the signal current from the current generator $T_I$ into the connected pair $P_C/P_S$ over to division by two, which exits now, while during the receiving it weakens the voltage from the pair $P_C/P_S$ to the voltage amplifier $E_V$. All this does not disturb the weakening of reflections at the connected end of the pair by the matching resistor/potentiometer R and by the introduced low frequency matching circuit W-R. With the increase of the frequency, the impedance of the introduced opening equalizing circuit $Z_{OE}$ is increased, and the impedance of the shorting equalizing circuit $Z_{SE}$ and the reactance of the capacitor $C_M$ is reduced. By the short-circuited matching resistor/potentiometer R at the connected end of the pair $P_C/P_S$ in accordance with the set change of impedance of the introduced opening equalizing circuit $Z_{OE}$, the mode of idle running is introduced and bring into use by it, and together with it the introduced resonant circuit LC and the equalizing (auto-) transformer T are bring into use, which amplify the efficiency of the introduced mode of idle running.

With the increase of frequency during the transition into the mode of idle running, the introduced capacitor $C_M$ short-circuits the matching resistor/potentiometer R and turns on in parallel the legs of the potentiometer into the signal circuit. The resistance of the potentiometer in the signal circuit reduces minimal 4 times and during the transition and in the mode of idle running minimum 4 times the losses of voltage and 16 times the energy of signal at the potentiometer are reduced during the transmitting and due to the non-ideal nature of the input of the voltage amplifier $R_V$-during the receiving. Besides that the matching resistor/potentiometer R which is shunted by the introduced capacitor $C_M$ together with the resistor having the resistance R, shunting the inductor with inductivity $L_Z$ of the introduced opening equalizing circuit $Z_{OE}$ or primary winding I with the inductivity $L_T$ of the introduced equalizing (auto-) transformer T by the condition $C_M = L_Z/R^2$ or $C_M = L_T/R^2$ have constant resistance R equal to the rated wave resistance of the pair $P_C/P_S$. The capacitor $C_M$ which is introduced in that way does not disturb the suppression of signal reflections at the connected end of the pair $P_C/P_S$ and therefore makes possible the use a surplus of an energy/amplification of the connected equipment for the increase of equalization from any as much as low frequencies at any as much as low attenuation of the pair, and most importantly in that way improves/increases the equalization at the upper limit of the transmitted frequency band. All these factors increase the transmission range and/or the transmitted bandwidth.

As a result, with the production of the potentiometer R and the weakening of signal at low frequencies controlled by it, the introduced circuits makes possible bring into use of uselessly lost surplus energy and amplification of the equipment connected by the pair, and at the given end of the span/s additionally equalize the system distortions of the connected pair, transmitted signal and systems telecommunication. The introduced control of the potentiometer makes possible equalization of various pairs and increase of the accuracy of equalization of the concrete pair.

The shorting equalizing circuit $Z_{SE}$, the shunting length-leg of the potentiometer R, eliminates the signal energy losses during transmitting, during transition and in the mode of idle running, and therefore increases the efficiency. During the receiving due to the "infinite" resistance of the input of the voltage amplifier of the signal receiver $R_V$, during the transition and in the mode of idle running there is "no" current at the end of the pair, and through the potentiometer/matching resistor R and is "no" signal voltage drop/loss of it and these results are achieved and without the shorting equalizing circuit $Z_{SE}$.

At the end/s of the span/s with the equipment/transmitter/receiver of signal such as a voltage generator and/or a current amplifier $T_V R_I$ (FIG. 1, b–d) the reflections of signal at the ends of the pair are introduced in the mode of short-circuit by the introduced shorting cable end connector-equalizer $C_S E$ (FIG. 4), in which the introduced shorting equalizing circuit $Z_{SE}$ shunts the matching resistor R which is connected in series between the transmitter-receiver $T_V R_I$ of the signal and coaxial $P_C$ (FIG. 4 a, b), or symmetrical $P_S$ (FIG. 4 c, d) pair of metallic wires. By the full short-circuiting of the matching resistor R by the circuit $Z_{SE}$, the end of the pair $P_C/P_S$ is connected directly to the "zero" output/input resistance of the voltage generator, and/or current amplifier $T_V R_I$. In the introduced mode of short-circuit the circuit $Z_{SE}$ doubles the signal voltage transmitted into the pair and/or signal current received from the pair and reduces the attenuation of the pair itself. Therefore the circuit $Z_{SE}$ eliminates the useless drop/loss of voltage and signal energy at the matching resistor R, which exists now in known systems.

In order to provide a transmission with the required accuracy/error ratio, the partial reflections of signal as well same or the required and sufficient introduction of mode of short-circuit are introduced and set by the parallel connected series R-C circuits of the introduced shorting equalizing circuit $Z_{SE}$ while a transition and full reflections in the mode of short-circuit is introduced by parallel connected to it capacitors and series resonant circuit of the circuit $Z_{SE}$.

The introduced resonant circuit LC (FIG. 4) by the shorting of the matching resistor R by the introduced shorting equalizing circuit $Z_{SE}$, resonantly amplifies the signal doubled by the introduced mode of short circuit. The influence of the circuit on the full reflections of the signal is suppressed together with the introduced echo and does not reduce the accuracy of the transmission and not increase the error ratio. During the transmitting a low Q-quality voltage resonance is introduced into the circuit LC and not half but the whole generator voltage $T_V$ which is resonantly amplified by the circuit LC is transmitted from the capacitor C into the connected pair. The current is equally increased in it. During the receiving the low Q-quality resonance of current is introduced in this same circuit LC, and from the end of the pair, by two times lower weakening of the received signal of the pair itself, the current of the received signal which is resonantly amplified in the inductive L-branch of the circuit LC is supplied to the current amplifier of the input of the receiver $E_V$.

By the introduction of the equalizing (auto-) transformer T (FIGS. 4, b, d) the secondary winding II with the inductivity $L_T$ which is shunted by the introduced resistor R connected in series with the matching resistor R shunted by the introduced capacitor $C_M$ with the capacity=$L_T/R^2$, equal to rated wave resistance R of the connected pair $P_C/P_S$, and through the "zero" resistance of the voltage generator/current amplifier $T_V R_I$ weakened the reflections of the signal at the connected end of the pair $P_C/P_S$ by a low attenuation of the pair. Altogether with the introduced the low frequency matching circuit W-R, in addition, the pair is equalized, and the signal is protected along the pair way from a low frequency/hum interferences.

With the increase of frequency in correspondence with the increase of attenuation of the pair, the impedance of the introduced shorting equalizing circuit $Z_{SE}$ is reduced to "zero", and the zero impedance of the circuit $Z_{SE}$ and the "zero" resistance of the voltage generator/current amplifier $T_V R_I$ short-circuit the primary winding I and through it the secondary winding II of the (auto-) transformer T. Simultaneously the reactance of introduced capacitor $C_M$ is reduced and becomes equally "zero" and through "the zero" reactance of the capacitor $C_M$ and the secondary winding II, bypassing both resistors R, at the connected end of the pair the mode of short-circuit is introduced. The shorting equalizing circuit $Z_{SE}$ in coordination with them by the shown way to provide the given/rated accuracy/error ratio of the transmission.

During the transmitting with transition into the mode of short-circuit through the "zero" impedance of shorting equalizing circuit $Z_{SE}$ the whole generator voltage $T_V$ (FIG. 4) appears at the primary winding I of the (auto-) transformer T, transformed with the turns ratio n into the secondary winding II and as a sum from both windings I and II the voltage increased by 1+n times is supplied to the pair $P_C/P_S$. In comparison with the division of the generator voltage $T_V$ by 2, due to the drop at the matching resistor which now exists, the voltage and current of the signal at the connected end of the pair increase by 2 (n+1) times. During the transmitting the opening equalizing circuit $Z_{OE}$ increases the efficiency-turn of the resistor R which shunts the winding II, and prevents signal energy losses at it.

During the receiving with transition into the mode of short-circuit the whole signal current, twice lower than the now weakened by the pair by its get lower than the now attenuation by passes the both resistors R (FIG. 4) through "the zero" reactance of the capacitor $C_M$ and the "short-circuiting" winding II directly to the current amplifier E, and also with turns ratio n is transformed into the primary winding I and through "the zero" impedance of the shorting equalizing circuit is supplied to the current amplifier $E_I$. In sum the signal current which is 2(n+1) times greater than now is supplied through the windings I and II of the (auto-) transformer T from the pair $P_C/P_S$ to the current amplifier of input of the receiver $E_I$. The input resistance of the real current amplifier $E_I$ is 100 times lower than the wave resistance R of the pair $P_C/P_S$, and bringing in the secondary winding II by $n^2$ times greater and still substantially lower than the resistance R of the resistor which shunts it. Therefore, almost whole signal current run through the secondary winding II, is transformed into the primary winding I, and received without the opening equalizing circuit $Z_{OE}$.

When the matching resistor R (FIG. 4) is formed as a matching divider with legs resistance R/m and R/(1−m), the connected divider controls the equalization: by $0 \leq m \leq 1$ together with the shorting equalizing circuit $Z_{SE}$ the surplus of energy and amplification of signal in the equipment connected by the pair is bring into use, so as to increase the equalization by 1/m times. During the transmitting the divider weakens/divides the signal voltage of the generator $T_V$ into pair, and during the receiving it weakens/divides the signal current from the pair to the amplifier $E_I$ and by low attenuation of the pair at low frequencies and surplus of energy and amplification installs rated level of transmission. With the increase of frequency the leg R/m of the divider is short circuited by the shorting equalizing circuit $Z_{SE}$ more and more, and the leg R/(1−m) is turned off by the opening equalizing circuit $Z_{OE}$. With the reduction to "zero" of the impedance of the circuit $Z_{SE}$ through the circuit $Z_{SE}$ bypassing the divider, the surplus energy is transmitted/received, voltage and current of the signal and their surplus are bring into use during the increase and maximum of attenuation of the pair, exactly when the equalizing is needed the most. As a result, instead of dividing by two which now exits, the connected divider increases 1/m times the equalization of signal which is already doubled and equalized in the mode of short-circuit and/or in addition amplified and equalized by the resonant circuit LC and/or by n+1 times which the (auto-) transformer T.

Relative to the end of the connected pair $P_C/P_S$ (FIG. 4) the legs of the matching divider are parallel: the leg R/m is connected to the leg R(1−m) through "the zero" resistance of the voltage generator/current amplifier $T_V R_I$, and by any installs as division and value of m, their resistance is constant and equal the rated wave resistance R of the pair. Under this through the introduced elements, the matching divider itself, or together with the low frequency matching circuit W-R weakens the reflections of the signal at the connected end of the pair and together with it weakens the low frequency/hum interferences which act/influenced along the pair way. The alternative matching resistive divider with the switching resistors for one leg to the other controls the level of equalization of the signal and provides the optimal use of energy possibilities of the equipment connected by the pair for equalization of any given pair with as much accuracy. The opening equalizing circuit $Z_{OE}$ connected in series to the leg R/(1−m) of the divider, disconnects it with the increase of frequency and prevents signal energy losses at it during the transmitting. During the receiving, almost whole current is received bypassing the divider without the circuit $Z_{OE}$ and it is not abligatary.

Setting/control transmitting/equalizing level by a fixed/variable low-frequency matching circuit put into use a uselessly lost surplus of an energy/amplification of the connected equipment also as the said matching resistive divider, act analogous to it and added or replaced it. With the increase of frequency the low-frequency matching circuit self-shortened and therefore act with the greatest efficiency.

Through the all introduced equalizing circuit the signal is transmitted from 0 Hz and the constant rated resistance R of the divider provides a rated mode of operation of the connected equipment in side of the direct current. In the transmitting amplifier $T_V$ of direct current the resonant circuit LC and/or (auto-) transformer T provides the signal voltage which exceeds the direct voltage supply.

At the connected end of the pair with the introduced mode of short-circuit, the shorting equalizing circuit $Z_{SE}$ doubles and the resonant circuit LC and the (auto-) transformer T increases the voltage, the current and the energy of signal squared times more, transmitted to the connected pair, and increase the received signal current and squared times more of the received signal energy. Correspondingly, during transmitting the system distortions of the pair and the signal are pre-equalized, and a pre-protection of the signal from influences/interfaces along the pair way and from noises of equipment which receive the signals at the other end of the pair is introduced, while during the receiving the attenuation of the pair is reduced and equalized and the protection of the signal from noises of the receiving equipment is increased.

The introduced end (auto-) transformer/s $T_{EE}$, $T_{LE}$ connected at the end/s of the cable end connector-equalizer and/or between branches of it (FIGS. 2, 4) with the voltage/current turns ratio more than 1 in a direction of the transmitted voltage/current of a signal/s equals increased the (pre-)amplification, (pre-)equalization, and (pre-)protection said introduced in the mode of the idle running and short-circuit. In particular the line end (auto-) transformer/s $T_{LE}$ connected a coaxial (symmetrical) pair to the cable end connector-equalizer of symmetrical (coaxial) design. The equipment end (auto-) transformer/s $T_{EE}$ switched on in addition or instead of the said introduced equalizing (auto-) transformer (FIGS. 2, c and 4, e) considerable simplify a introduced cable end connector-equalizers. Via the end (auto-) transformer/s is transmitted the whole signal/s and owing to a relaxation of the low-frequencies introduced of it/s is suppressed low-frequency and hum interferences. Besides that, the end (auto-) transformer/s with the galvanic isolated windings galvanic isolated a equipment connected via pair and owing to this is suppressed interferences of the ground currents and protect connectors from damage by ground currents.

The resonanting capacitor/s $C_R$ connected to the winging/s of the introduced (auto-)transformer/s formed a resonant circuit/s (FIGS. 2,4) which runned and (pre-)amplified, (pre-)equalized, and (pre-)protected the signal/s be analogously to the said introduced resonant circuit/s LC, be analogously controls of the said introduced echo reflections of signal/s in a mode of the idle running or short-circuit and acts proportionally to it.

As a result, during simplex and (half-)duplex transmission in accordance with the inventive method, the signal is transmitted or received at the given end of the coaxial or symmetrical pair of metallic wires of the given span, and during the duplex transmission of the same way with the same circuit, simultaneously/independently is transmitted and received in the mode of idle running or short-circuit. The taps of the windings of the resonant circuit and the (auto-) transformer provide a better use of the energy and amplification of the equipment, especially by the duplex transmission.

By the existing equipment which is improved in accordance with the inventive method by the inventive devices, in each span of the system of transmission with the introduced cable end connector-equalizer (FIGS. 2–4), at both ends of the pair (FIG. 1) the uselessly lost energy of signal is bring into use, and the signal, its equalization and protection/immunity to interferences/noise is increased at average 32 times/by 30 dB, while the efficiency is increased 1000 times squared times more. At the pair heats, the cable end connector-equalizer increases the transmitted signal (4 times:2 times by the (auto-) transformer which n=1 and more or without of it) minimum 2 times by the introduction of the mode of idle running or short-circuit, and at the pair end the other cable end connector-equalizer reduces 2 times the weakening of the received signal by the pair which attenuation became of smaller during the introduction the mode of idle running or short-circuit, and increases the signal 6 times by the (auto-) transformer with n=5. For maximum equalization and pre-protection the signal from noises of the input of the receiving equipment by the cable end connector-equalizer, their equalization is introduced from minimal possible frequencies, and for the simultaneous better pre-protection from low frequency/hum/influences/interferences along the pair way their pre-equalization is introduced at the side of the transmitting is possible.

In the span/s with the equalization of the existing equipment by 15 dB attenuation, the said cable end connector-equalizers connected at the ends of the pair increase the equalization up to 45 dB, and increase by 3 times the transmission range/span length or augments by 9 times the equalized frequency band/speed of transmission. In the spans of long distance lines the cable end connectors-equalizers increase the attenuation equalization of the pair from 60 to 90 dB, and increase the upper transmission limit of range/span length by 1.5 times, or augments the upper attenuation limit of transmitted/equalized frequency band by 2.25 times, as well as the speed of transmission, and the carrying capacity.

This is 2–4 times more channels, miles, services, and therefore profits as well.

This is doubling/tripling of existing telecommunication networks without laying of new and replacement of existing cables which are very expensive and take a lot of time.

This also reduces the quantity of equipment, the section of wires, the number of spans and the electrical energy consumption.

This also simplifies and reduces the cost of the telecommunication as a whole as well as the equipment and coaxial and symmetrical cables in particular.

The connection of the introduced cable end connector-equalizer to the improved equipment through an one/both-way repeater/equalizer/regenerator/converter, whose inputs/outputs separately correspond to the connected cable end connectors-equalizer and the input/output resistance of the improved equipment, immediately improves this equipment and together with it improved the connected existing coaxial and symmetrical pair of metallic wires. Such the active cable end connector-equalizer immediately realizes the inventive method of telecommunication and its possibilities.

Independently from the pair attenuation the proposed method and device introduced/used at the end of the "short" pair which is shorter than quarter wavelength of the upper frequency limit of the transmitted signal. Is shorter than 50 ft during the transmission of a video signal 5 MHz and data 10 Mbpc, shorter than 73 kft in the telephone line 3.4 kHz, shorter than 11 ft during transmission of 672 channels with the speed of 44.736 Mbps/T3, shorter than 320 ft by 24 channels and the speed 1.544 Mbps/T1, etc. Neither partial, nor full signal reflections from the ends of the "short" pair no distinguished from the basic signal, and in the transmitted frequency band with identical/different modes at the end of the pair the introduced equalization of attenuation only monitonoriously somewhat weakens/amplified. One cable end connector-equalizer (FIG. 2, 4) at any end of the "short" pair gives the above mentioned gains in equalization, amplification and protection to interferences/noises, and the together two at the opposite ends gives by 6 dB less than sum of gains provided by each separately.

The two-side active cable end connector-equalizer the as two cable end connector-equalizers connected by one/both-way repeater/equalizer/regenerator/converter is used so that one cable end connector-equalizer equalized/improves of the pair of the span directly, while the other one through a "short" pair connected to the improved equipment-transmitter-receiver through the first one in addition equalized the same pair of the same span. Together they equalized approximately twice more attenuation of the coaxial or symmetrical pair of metallic wires of the smaller section, greater length and/or in a greater bandwidth.

In spite of the international recommendations CCITT and CCIR and the standards of all countries which recommend/ require the suppression of signal reflections at the each end of the pair them 16–32 times/by 24–30 dB, in accordance with the inventive method to the contrary it is as much as possible and permissible to reflect the signals, and in that way by the new method the new devices-the introduced cable end connectors-equalizers connected at the end/s of the existing coaxial and symmetrical pairs of metallic wires of the span/s of the systems of telecommunication, release and bring into use to as much as possible the latend today incredible big and smart signal energy which is useless lost now in existing equipment of the existing spans of the existing telecommunication systems.

By implement of the new method acted in accordance with the present invention the new devices performed in accordance with the present invention—the introduced cable end connectors-equalizers the following innovations are obtained:

for the first time during the transmitting by means of engage reflections of signal at the pair heat, the hidden uselessly lost energy of the signal in the transmitter is released and bring into use, and this release energy increases as much as possible the voltage, the current as well as the energy of the transmitted signal at the pair heat of metallic wires, the signal is pre-protected from influences/interferences along the pair way and from noises of the receiving equipment at the other end of the pair, and the system distortions of the signal by the pair is pre-equalized; and for the first time by means of engage reflections of signal at the pair end/s all energy of the signal in the metallic wires of the connected pair is bring into use and used as much as possible, and this energy reduces the attenuation of the connected existing pair and the system distortions of the signal by the pair, as well as the signals protected from influences/interferences along the pair way and at the receiving end of the pair from the noise of the receiving equipment; and for the first time during the receiving bv means of engage the reflections of the signal the uselessly lost energy of signal supplied through the pair is released and bring into use, and the release energy is used as much as possible for increase and equalization of the voltage only or the current only of the received and reflected energy of the received signal, and thereby separately with the voltage or the current of the received signal, the useful "zero" energy of the transmitted signal is increased at real "infinite" or "zero" resistance of the real input of the real voltage or the current amplifier of the real signal receiver.

As a result, in the systems of telecommunication the present invention realizes the all above indicated:

frequency band, speed of transmission, carrying capacity is increased; and/or a transmission range/spans length is increased; and the section of wires, quantity of equipment, number of spans, consumed electrical energy is reduced; and telecommunication and in particular the equipment and cables of the telecommunications is simplified, developed and reduced of prices; and value of services and profitability of the telecommunication is increased.

Fiber optics and metallic waveguides and other cables of telecommunications are analogously equalized with the inventive method by corresponding devices, analogous to the devices for coaxial and symmetrical pair of metallic wires.

In principal, in accordance with the inventive method by means of the inventive device for telecommunication, the signal energy is not transmitted, but used for transmission of signal along wires/waveguide/cables. During the transmitting the as much as possible signal energy is introduced on the pair heat, and during the receiving all arrived energy is reflected as much as possible from the pair end and instead of energy which gets useless the most and after lost now during receiving, only the voltage of arrived and reflected energy of the received signal, or only its current, or only field, etc. are maximized, which the only are perceived by existing/known amplifiers.

It will be understood that each of the elements described above, or two or more together, may also find a useful application in other types of constructions and methods differing from the types described above.

While the invention has been illustrated and described as embodied in method of and device for telecommunication, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of telecommunications through a cable selected from group consisting coaxial and symmetrical pairs of metallic wires, waveguide, and fiber optic of cables of the one- and multi-span one- and multi-channel analog and digital local and long distance simplex and (half)duplex data, television, telephony, internet, and generally any cable lines, wherein to immediate increase the frequency band, transmission speed, carrying capacity, and/or span length, and/or using the thinnest gauge wire, and/or reduce the quantity of equipment and the number of spans, and/or improve, simplify and reduce cost of them and the existing telecommunications by using of the hidden uselessly losing energy of signal and its electrical power supply, by weakening of it inside the improved spans the loss and distortion of existing cable, and/or conversion of it into additional amplification, equalization, and protection to interference and noise, said method comprising the steps of:

a) reflecting an energy of signals and interference arrived to the given improved cable end over cable back into this improved existing cable by a connected to it equipment by receiving-transmitting at this end of this cable, comprises:

b) reflecting an energy of signals and interference at each of the improved end of an improved existing cable of each of the improved cable span of an improved one- and multi-span cable line up to at both ends of a cable of all spans, comprises:

c) reflecting an energy of signals and interference by means of decreasing of a return loss toward to zero on the given improved cable end by a receiver-transmilter equipment connected to it respectively to an increment of adapted introduced of it equalization of cable loss due regard for a return loss at the opposite end of an improved existing cable of a given improved cable span and the sufficient decreasing their sum only to the value of a difference between a minimum of the reflections attenuation which provides a desired practically ideal finite accuracy of transmission and a doubled cable loss of less, than this minimum, and to zero by cable loss of more and independent of cable loss by cable length of short, than quarter wavelength of the upper-frequency limit of the transmitted signals.

2. A method of telecommunications of claim 1, wherein the reflecting step (a) further comprising the steps of:

d) reflecting an energy of signal and interference in an idle running mode at the improved end of an improved existing cable of an improved cable span by connected to it a receiver-transmitter equipment with stage/s selected from the group consisting of an input voltage amplifier and an output current generator, cornprises:

e) changing an input-output impedance of a receiver-transmitter equipment with an increment of frequency from the rating character impedance of a connected improved exiting cable toward to infinity, respectively to the required equalization and the sufficient decreasing of return loss of step (c).

3. A method of telecommunications of claim 1, wherein said reflecting step (a) further comprising the steps of:

f) reflecting an energy of signals and interference in a short-circuit mode at the improved end of an improved existing cable of an improved cable span by connected to it a receiver-transmitter equipment with stage/s selected from the group consisting of an input current amplifier and an output voltage generator, comprises:

g) charging an input-output impedance of a receiver-transmitter equipment with an increment of frequency from the rating character impedance of a connected improved existing cable toward to zero, respectively to the required equalization and the sufficient decreasing of return loss of step (c).

4. A method of telecommunications of claim 1, wherein said method further comprising the step of:

h) producing a signal amplification, equalization, and protection to interference and noise by an equalizing (auto)transformier, that controls by the reflecting of step (a) and acts proportionally to it.

5. A method of teleconmunications of claim 1, wherein said method further comprising the step of:

i) producing a signal amplification, equalization, and protection to interference and noise by an equalizing resonant circuits, that controls by the reflecting of step (a) and acts proportionally to it.

6. A device for telecommunications, wherein for connecting cables to a receiver-transmitter equipment and immediate improvement of the existing telecommunications comprising:

a) reflection equalizer disposed between the improved end of an existing cable and connected to it receiver-transmitter equipment for reflecting an energy of signals and interference arrived to this improved cable end over this cable back into this cable by travel signals in and out of said receiver-transmitter equipment; and said reflection equalizer being selected from the group consisting:

b) opening reflection equalizer disposed between the improved cable end and connected to it stage/s selected from the group consisting of an input voltage amplifier and an output current generator of connected to it said receiver-transmitter equipment for reflecting an energy of signals and interference in an idle running mode at the connected cable end by travel signals in and out of said receiver-transmitter equipment; and c) shorting reflection equalizer disposed between the improved cable end and connected to it stage/s selected from the group consisting of an input current amplifier and an output voltage generator of connected to it said receiver-transmitter equipment for reflecting an energy of signals and interference in a short-circuit mode at the connected cable end by travel signals in and out of said receiver-transmitter equipment.

7. A device for telecommunications of claim 6, wherein each said opening reflection equalizer (b) comprising:

d) opening reflecting equalizing circuit shunted said pair end and together said input voltage amplifier and output current generator of connected to it receiver-transmitter equipment for producing, controlling, and adapting of the reflecting an energy of signals and interference by step (a) in an idle running mode at this pair end, respectively to the required equalization and the sufficient decreasing of return loss by step (c) comprises:

e) opening mismatching equalizing circuit formed as components selected from the group consisting of connected in series inductors, shunted by resistor/s, capacitor/s, and R-C circuit/s; and in series to it connected f) matching resistor with the rating character resistance of the pair.

8. A device for telecommunications of claim 7, wherein for increasing efficiency and adapting of the introduced equalization to the given concrete pair said opening reflection equalizer (b) further comprising circuits selected from the group consisting:

g) low-frequency matching circuit with impedance equal to an increment of a characteristic impedance of the pair at low-frequencies connected in series to the pair end and said opening reflecting equalizing circuit (d) and formed as connected in series resistors shunted by capacitors and R-C circuits;

h) equalizing resonant circuit with inductor/s connected in series between the wire/s of the pair end and said amplifier-generator of (b) of a receiver-transmitter equipment, and capacitor/s connected each between the end of each inductor to the amplifier-generator of (b) and the circuit of other wire of the pair;

i) capacitor connected in parallel to the matching resistor (f);

j) resistor of the opening mismatching equalizing circuit (e) formed with rating character resistance R of the pair shunted by the inductor of this circuit (e) with inductance $L_z$ and also the capacitor (i) formed with a capacity=$L_Z/R^2$;

k) equalizing (auto)transformer with the primary coil connected in parallel to said opening mismatching equalizing circuit (e) and the secondary coil is in cumulative to primary connected in series to said amplifier-generator of (b);

l) resistor with rating character resistance R connected in series to said opening mismatching equalizing circuit (e), and they shunts the primary coil with inductance $L_T$ of the equalizing (auto)transformer (k), while the capacitor (i) formed with a capacity=$L_T/R^2$;

m) matching resistor (f) formed as a potentiometer with one leg connected to the pair end, and the tap connected to said amplifier-generator of (b) (through introduced circuit/s);

n) capacitor connected to the potentiometer (m) leg connected to the pair end; and o) resonant capacitor/s connected to coil/s of the equalizing (auto)transformer (k), to the pair, and input-output of connected said receiver-transmitter equipment of (b).

9. A device for telecommunications of claim 6, wherein each said shorting reflection equalizer (c) comprising:

p) shorting reflecting equalizing circuit connected in series between said pair end and said input current amplifier and output voltage generator of said connected to it receiver-transmitter equipment for producing, controlling, and adapting of the reflecting an energy of signals and interference by step (a) in a short-circuit mode at this pair end, respectively to the required equalization and the sufficient decreasing of return loss by step (c) comprises:

q) shorting mismatching equalizing circuit formed as components selected from the group consisting of connected in parallel series resonant circuit/s, capacitor/s, series and integrating stair R-C circuit/s; shunted by r) matching resistor (f).

10. A device for telecommunications of claim 9, wherein for increasing efficiency and adapting of the introduced equalization to the given concrete pair said shorting reflection equalizer (c) further comprising circuits selected from the group consisting:

s) low-frequency matching circuit (g) connected in series to matching resistor (r);

t) equalizing resonant circuit with inductor/s connected in series between the wire/s of the pair end and said amplifier-generator of (c) of a receiver-transmitter equipment, and capacitor/s connected each between the end of each inductor to the pair end and the circuit of it other wire;

u) equalizing (auto)transformer with the primary coil connected to said amplifier-generator of (c) through said shorting mismatching equalizing circuit (q), whose the secondary coil with inductance $L_T$ is in cumulative to primary connected to said amplifier-generator of (c) through the matching resistor (r) and is shunted by the second matching resistor with character resistance R of the pair, and said matching resistor (r) is shunted by the capacitor with capacity=$L_T/R^2$;

v) matching resistor (r) with resistance R formed as a matching resistive divider connected in parallel to a said amplifier-generator of (c) with the resistance of the parallel connection of legs of the divider equal R, whose one leg be the cross-branch and (through introduced circuit/s) is connected to the pair, while the another leg be the length-branch and is shunted by the shorting mismatching equalizing circuit (p) and respectively by capacitor introduced in common with equalizing (auto)transformer (u); and for equalization control and increasing of the introduced equalization comprises:

w) row of weight resistors with a resistance of a parallel connection equal R, and the resistance of each more than R and inversely proportional to a relative step of change of its division, with a switch from one leg of divider to another; and x) resonant capacitor/s connected to coil/s of the equalizing (auto)transformer (u), to the pair, and input-output of connected said receiver-transmitter equipment of (c).

11. A device for telecommunications of claims 6, wherein the reflection equalizer/s (b), (c) formed as unbalanced for coaxial and balanced for symmetrical pairs for matching further comprising:

y) end (auto)transformer/s disposed at the pair end, between branches, and at an input-output of the amplifier-generator of a receiver-transmitter equipment, as the balun, and as the hum suppressor of ground currents.

12. A device for telecommunications of claim 8, comprising the shorting mismatching equalizing circuit (q) connected to the potentiometer (m) leg connected to the pair end.

13. A device for telecommunications of claim 10, comprising the opening mismatching equalizing circuit (e) connected in series to the second matching resistor shunted the secondary coil of the equalizing (auto)transformer (u).

14. A device for telecommunications of claim 10, comprising the opening mismatching equalizing circuit (e) connected in series to the leg of the matching resistive divider (v) connected as the cross-leg.

15. A device for telecommunications of claim 6, wherein by two-wire duplex said opening reflection equalizer (b) disposed between the pair end and the connected in parallel said output current generator and input voltage amplifier.

16. A device for telecommunications of claim 6, wherein by two-wire duplex said shorting reflection equalizer (c) disposed between the pair end and the connected in series said output voltage generator and input current amplifier.

17. A device for telecommunications of claim 6, comprising adjustable inductor/s formed out of the several fixed inductors switched cumulative and counter in parallel and series, shifted and turned an one to/from relatively an other on inductors leads, and for dependence glued on inductor ends to a plate of its mount.

* * * * *